Jan. 3, 1956     L. A. McCARTHY     2,728,994

GAGING AND TESTING APPARATUS

Filed Feb. 16, 1953     2 Sheets-Sheet 1

INVENTOR
L. A. McCARTHY
BY *[signature]*
ATTORNEY

Jan. 3, 1956
L. A. McCARTHY
2,728,994
GAGING AND TESTING APPARATUS
Filed Feb. 16, 1953
2 Sheets-Sheet 2
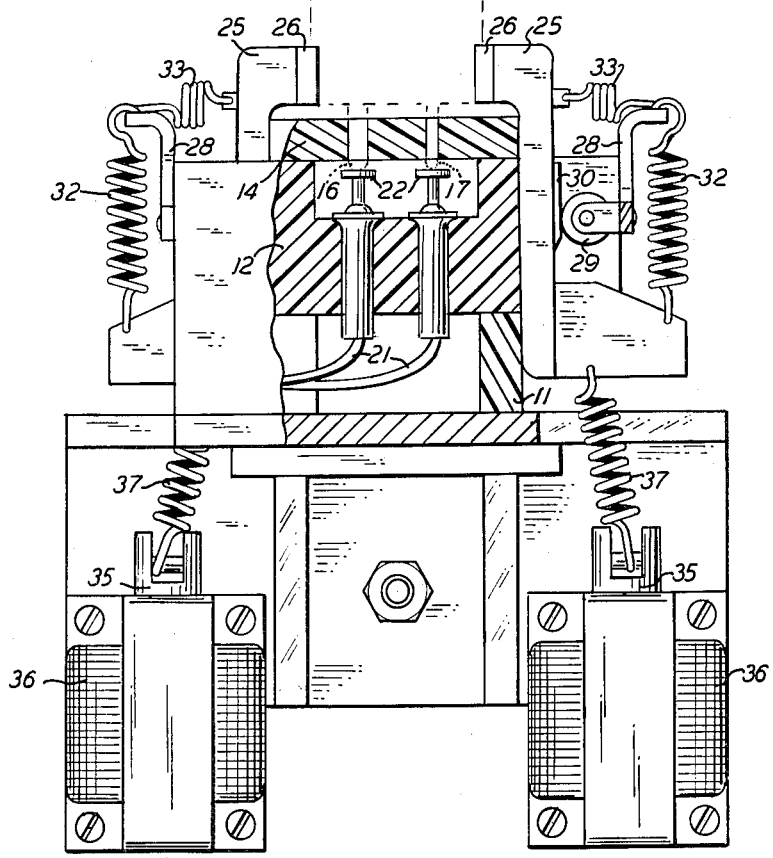
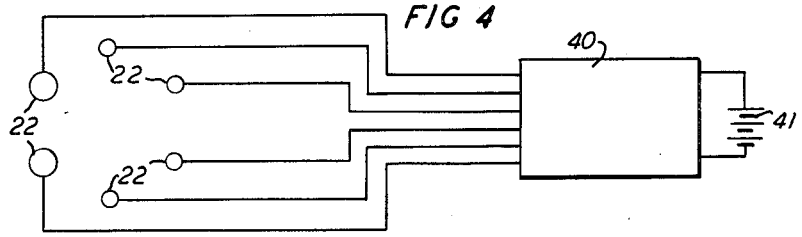
INVENTOR
L. A. McCARTHY
BY *W. C. Parnell*
ATTORNEY

United States Patent Office 2,728,994
Patented Jan. 3, 1956

2,728,994
GAGING AND TESTING APPARATUS

Lawrence A. McCarthy, Haverhill, Mass., assignor to Western Electric Company, Incorporated, New York, N. Y., a corporation of New York Application February 16, 1953, Serial No. 337,032

6 Claims. (Cl. 33—174)

This invention relates to apparatus for testing electrical units and more particularly to apparatus for testing the relative positions of terminals of electrical units and the elements associated therewith.

Numerous electrical units are provided with terminals which vary in numbers and sizes depending upon the parts of the electrical units which must be included through the terminals in electrical circuits. Electrical units of this type usually receive their connections in the electrical circuits by the aid of sockets having apertures of given sizes disposed at known positions relative to each other. It is of utmost importance, therefore, that the terminals of the electrical units for the sockets be disposed in their proper positions relative to each other to assure their reception in the sockets.

The object of the present invention is an apparatus which, although simple in structure and readily actuable, is highly efficient in testing the relative positions of terminals of electrical units.

With this and other objects in view, the invention comprises an apparatus for testing electrical units having terminals to be disposed at given spaced positions relative to each other, the apparatus including a gage member having apertures of the known sizes disposed at the given positions relative to each other, and means actuable to grip the units singly and apply a known force thereto which is sufficient to move the terminals through the apertures if they are in their proper positions.

In the present embodiment of the invention, the gripping means include like elements normally held in open position and actuable through the energization of solenoids and the intermediate springs to move the gripping elements under known forces. During the first portions of the movements of the gripping elements, cams function to force them into gripping relation with the unit being tested, additional movements of the elements being utilized to move the terminals into the apertures of the gage member should they be positioned properly with respect to each other. Electrical contacts forming parts of circuits of an electrical testing unit are positioned adjacent the apertures of the gage member to include the terminals of the electrical unit in the circuits for test should they be moved through their gaging apertures.

Other objects and advantages will be apparent from the following detailed description when considered in conjunction with the accompanying drawings wherein:

Fig. 3 is a vertical sectional view, as shown in Fig. 2, of the apparatus illustrating the end of the operating stroke thereof, and Fig. 4 is a schematic illustration of the testing circuits.

Figure 1:
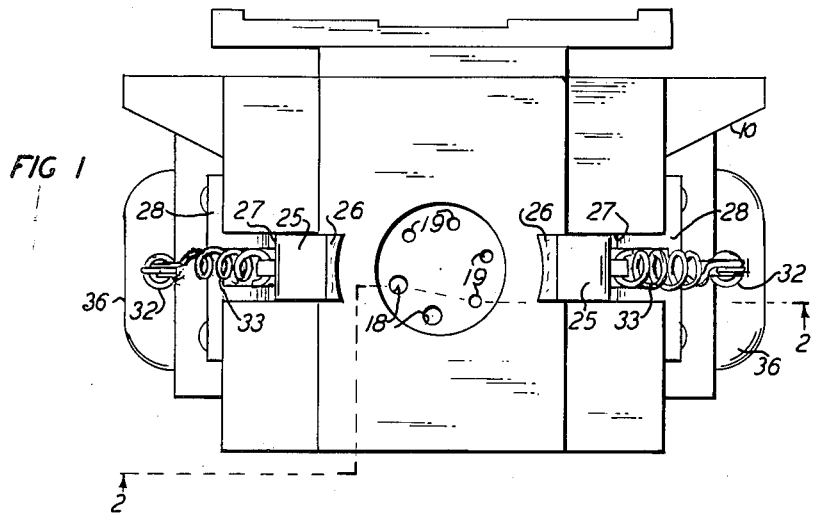
Fig. 1 is a top plan view of the apparatus.

The apparatus includes a main frame 10 upon which is mounted a hollow dielectric member 11, a contact supporting member 12 of dielectric material and also a gage member 14 of suitable dielectric material. The members 12 and 14 may be replaced, if so desired, with any other similar members adapted for different types of electrical units to be tested, and more particularly the number and relative positions of the terminals thereof. At present, the electrical unit 15 is known as a resistance unit having six terminals utilized in pairs for three resistance coils. Two of the terminals may be identified as large terminals 16 while the others may be identified as small terminals 17 to assure proper positioning of the terminals in their sockets.

The gage member 14 is provided with apertures 18 and 19 accurately disposed in circular arrangement and of sizes corresponding to the diameters of the terminals 16 and 17, there being the necessary differences in size to allow movement of the terminals through the apertures if the terminals are correctly positioned relative to each other.

The dielectric member 12 is apertured to receive a plurality of contact units 20 of the commercially known type wherein their shells are connected electrically to conductors 21 and are in the form of tubular housings wherein springs are disposed to normally urge the movable contacts 22 outwardly to pre-determined positions adjacent the inner ends of their respective apertures 18 and 19.

Figure 2:
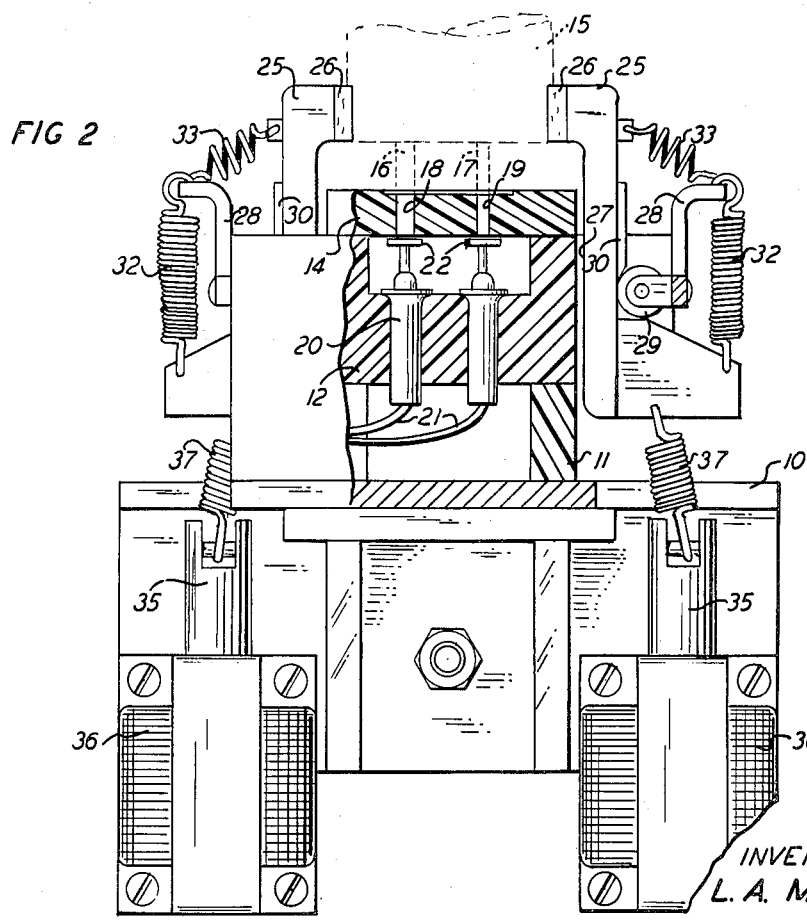
Fig. 2 is a vertical sectional view taken substantially along the line of 2—2 of Fig. 1.

Gripping elements 25, carrying flexible pads 26 on their upper faces, are positioned for movement in notches 27 in the member 12, the notches being closed at the sides thereof by brackets 28. The brackets 28 rotatably support rollers 29, positioned to act on cams 30 of the gripping elements 25 to force the gripping elements inwardly at the start of downward movement of the elements. The gripping elements are urged into their normal positions, shown in Fig. 2, by springs 32 and 33 interposed between their respective brackets 28 and the lower and upper portions of the gripping elements to which they are secured.

Means to move the gripping elements under like known forces into operated positions include cores 35 of solenoids 36 which are fixed to portions of the frame 10. The cores 35 are normally urged upwardly by springs 37 which connect their respective cores to their gripping elements, the actual vertical movement of the cores originating in the springs 32 and 33.

Attention is now directed to Fig. 4 which illustrates the contacts 22 included in their respective circuits leading to an electrical testing unit 40 supplied with suitable electrical energy from a suitable means such as a battery 41. Although the contacts 22 in actual structure are identical, two of them have been shown larger to correspond to the larger apertures 18 of the gage member and the larger terminals 16 of the unit to be tested.

Considering now the operation of the apparatus, let it be assumed that the first article to be tested includes one or more terminals 16 or 17 which are improperly positioned with respect to the other terminals. By the term "improperly positioned," it is meant that these terminals may be bent out of parallel relationship with the other terminals or be damaged in some way to prevent them from entering their respective apertures 18 or 19. If an article with terminals of this condition should be placed on the gage member and the solenoids 36 energized, the downward movement of the cores 36 would apply a given force to the gripping elements 25 moving them downwardly as far as possible causing the cams 30 to ride on the cam rollers to move the pads 26 into gripping engagement with the unit under test, but further movement of the gripping elements would be prevented as the defective terminals of the unit under test would not enter the gaging apertures in the gage member 14. In certain instances, the defective conditions of the terminals may be such that with considerable force, that which may be applied to the unit if it should be manually forced toward the gage member, the terminals may be forced into their apertures. However, this condition is undesirable for satisfactorily mounting the unit in apparatus of which it is to be a part. For this reason, manual effort alone cannot be relied upon to provide a known limited force to attempt movement of the terminals into the apertures of a gage member. The apparatus was designed, therefore, to apply the said force, and if the terminals of the unit under test move through the apertures and into engagement with the contacts 22 under this force, the units under test are acceptable. However, another test is made through the testing unit 40 when the terminals are included in the testing circuits by their engagement with the contacts 22. After the completion of the two tests, one of which may be described as gaging the terminals and the other testing the resistances associated therewith, the solenoids 36 are de-energized allowing the springs 32 to return the gripping elements to their normal positions and by so doing, ejecting the unit under test from the gaging member and freeing it for removal manually from the apparatus.

During repeated operations of the apparatus, the rejected units may be placed in one container and the accepted units in another. If desired, a third container may be provided for only those electrical units which have properly positioned terminals but have failed the tests submitted to them by the electrical testing unit 40.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for testing electrical units having terminals to be disposed at given spaced positions relative to each other, the apparatus comprising a gage member having apertures disposed therein to receive the terminals of the units when in their given positions, gripping elements mounted for movement relative to the gage member to grip the units singly, means to apply a given force to the elements to move the unit to move the terminals thereof into their apertures of the gage member if the terminals are disposed at the given positions relative to each other, and means actuable during the start of the movement of the elements toward the gage member to move them toward each other into gripping engagement with the unit to cause them to firmly grip the unit.

2. An apparatus for testing electrical units having terminals to be disposed at given spaced positions relative to each other, the apparatus comprising a gage member having apertures disposed therein to receive the terminals of the units when in their given positions, gripping elements movable longitudinally between normal and operated positions, means to apply like forces to the gripping elements tending to move them into their operated positions, and means effective at the start of the longitudinal movement of the elements out of their normal positions to move them laterally toward each other into gripping engagement with a unit to be tested.

3. An apparatus for testing electrical units having terminals to be disposed at given spaced positions relative to each other, the apparatus comprising a gage member having apertures disposed therein to receive the terminals of the units when in their given positions, gripping elements movable longitudinally between normal and operated positions, means to apply like forces to the gripping elements tending to move them longitudinally into their operated positions, and means effective to cause the elements to move laterally toward each other to firmly grip a unit when leaving the normal positions, hold the elements in their gripping positions with the unit until the elements are returned to their normal positions when they are caused to free the article.

4. An apparatus for testing electrical units having terminals to be disposed at given spaced positions relative to each other, the apparatus comprising a gage member having apertures disposed therein to receive the terminals of the units when in their given positions, gripping elements movable longitudinally between normal and operated positions, means to apply like forces to the gripping elements tending to move them longitudinally into their operated positions, means to cause the elements to move laterally toward each other to grip the unit whereby the terminals thereof may be forced into their apertures, and means to move the gripping elements toward their normal positions to eject the terminals from the apertures.

5. An apparatus for testing electrical units having terminals to be disposed at given spaced positions relative to each other, the apparatus comprising a gage member having apertures disposed therein to receive the terminals of the units when in their given positions, gripping elements movable longitudinally between normal and operated positions, springs normally urging the gripping elements longitudinally toward their normal positions and to eject the terminals of a unit under test from their apertures, means to force the elements laterally toward each other into gripping engagement with the unit while they are absent from their normal positions, and solenoids having their cores operatively connected to the gripping elements to move them under like forces toward their operated positions against the forces of the springs.

6. An apparatus for testing electrical units having terminals to be disposed at given spaced positions relative to each other, the apparatus comprising a fixed gage member having apertures disposed therein to receive the terminals of the units when in their given positions, a pair of laterally and longitudinally movable gripping elements, solenoids, having cores and springs connecting the cores to their respective gripping elements, energizable to jointly apply a given force to the elements to move them longitudinally to move a unit placed on the gage member to move the terminals thereof into the apertures of the gage member, spring means rendered effective on de-energization of the solenoids to move the gripping elements longitudinally to cause them to remove the terminals of the unit from the gage member, and cam means adapted to move the elements laterally into gripping engagement with the unit at the start of the first longitudinal movement of the elements and to hold them in said gripping positions until the terminals are removed from the gage member during the second vertical movement.

References Cited in the file of this patent

UNITED STATES PATENTS

| | | |
|---|---|---|
| 1,955,794 | Du Mont | Apr. 24, 1934 |
| 2,554,982 | Hartley | May 29, 1951 |
| 2,606,228 | Chouljian | Aug. 5, 1952 |